July 13, 1926.　　　　　A. C. WEBSTER　　　　　1,592,167
LEVER
Filed June 18, 1925

Inventor
Arvin C. Webster
By Irving Harness
Attorney

Patented July 13, 1926.

1,592,167

UNITED STATES PATENT OFFICE.

ARVIN C. WEBSTER, OF DETROIT, MICHIGAN.

LEVER.

Application filed June 18, 1925. Serial No. 38,096.

It is the primary object of my invention to provide a cheap and economical lever capable of a multitude of uses, such as connections for brake rods, bell cranks and the like. It has heretofore been the practice to construct such levers of castings and it is the primary object of my invention to construct the same of sheet metal.

It is a still further object of my invention to provide novel means for securing the lever in place upon a shaft or the like.

With the above and other objects in view, my invention consists in the arrangement, combination and construction of the various parts of my improved device as described in the specification, claimed in my claims and shown in the accompanying drawing.

Figure 1:
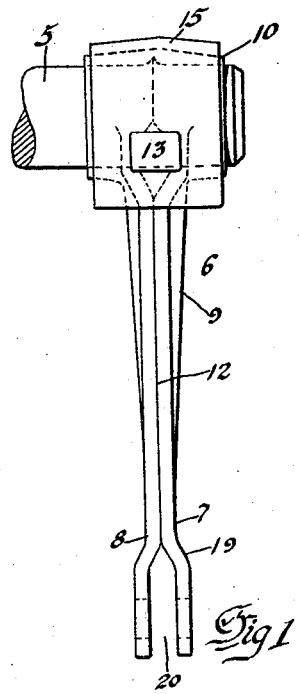
Fig. 1 is a front elevation showing my invention.
Figure 2:
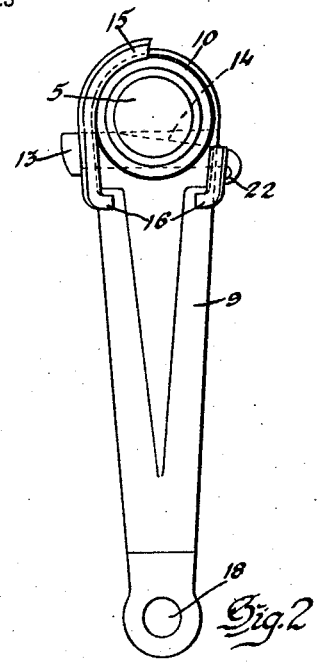
Fig. 2 is an end elevation of the same.
Figure 3:
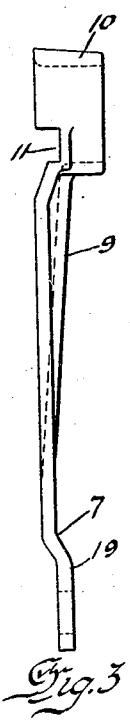
Fig. 3 is a front elevation showing one of the sections used in forming my improved lever.
Figure 4:
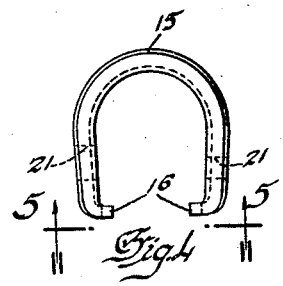
Fig. 4 is an end view of a securing clamp utilized with my invention.
Figure 5:
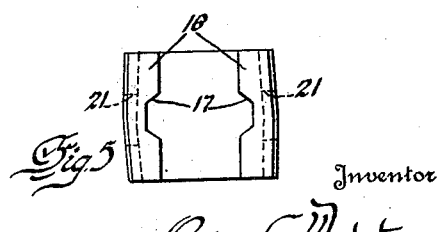
Fig. 5 is a view taken on line 5—5 of Fig. 4.

I have shown a shaft 5, to which my improved lever, indicated generally as 6, is to be secured.

The lever 6 is composed of two similar sections of sheet metal 7 and 8 having reinforcing ribs 9 thereon and centrally apertured heads or bosses 10, with cut-out portions 11 therein. The two sections 7 and 8 as shown are placed side by side and welded together along the line 12, although they may be riveted together, so as to provide substantially a one-piece construction formed entirely of sheet metal.

For securing the lever upon the shaft 5, a spring cap 15 is placed over the head 10, a key 13 is inserted through the openings 21 in the cap, the groove formed by the cut-out portions 11, and a similar groove 14 in the shaft, thus preventing longitudinal displacement of the lever upon the shaft. In order to secure the key 13 against endwise displacement in its groove, the same is made of tapered formation so that it may be driven in place, and the end 22 thereof is bent over against the outside of the cap 15. Inwardly bent flanges 16 are provided on the ends of the cap 15, such flanges being provided intermediate their edges with notches 17 adapted to engage the reinforcing ribs 9 on the sections 7 and 8. This construction tends to hold the two sections of the head and of the lever as a whole from spreading apart.

The ends of the sections 7 and 8 opposite from the head portions 10 are provided with aligned apertures 18 adapted for suitable connection with the usual or desirable operating means for the lever. Said ends are also bent outwardly as at 19 so as to provide a space 20 between them for making a clevis connection.

I desire it to be understood that my invention is applicable to a large number of uses and designs, and where I refer to "lever" in either the specification or claims, I intend the reference to include bell cranks, and various other forms of devices, wherein the head is either on the end or intermediate the ends.

What I claim is:

1. A lever comprising a pair of sheet metal strips having apertured bosses formed thereon, and means for securing said strips together, including, at least partially, a cap disposed over said bosses.

2. A lever comprising a pair of sheet metal strips having apertured bosses formed thereon, webs formed on said strips, and a cap disposed over said bosses and engaging said webs for at least assisting in holding said strips together.

3. A lever comprising a pair of sheet metal strips having apertured bosses formed thereon, webs formed on said strips, a cap disposed over said bosses having flanged separated ends disposed partially under said bosses and notches cut in said flanges engaging said webs.

4. In combination, a lever comprising a pair of sheet metal strips having apertured bosses formed thereon, a shaft extended into said bosses, a groove in said shaft, a cap over said bosses, apertured in said cap, a key disposed through said apertures in said cap and through said groove, said key being enlarged at one end and bent over on the other end, to secure it against displacement.

5. In combination, a lever comprising a pair of sheet metal strips having apertured bosses formed thereon, a shaft extended into said bosses, a groove in said shaft, a cap over said bosses, apertures in said cap, a key disposed through said apertures in said cap and through said groove, said key being enlarged at one end and bent over on the other end, to secure it against displacement, said cap having inturned flanges on its bottom adapted to engage said strips and prevent spreading thereof.

ARVIN C. WEBSTER.